US008600842B1

(12) United States Patent (10) Patent No.: US 8,600,842 B1
Sanders et al. (45) Date of Patent: Dec. 3, 2013

(54) UNIVERSAL CARTRIDGE FOR DIFFERENT CASH RECYCLERS

(75) Inventors: William Thomas Sanders, Denver, NC (US); Daniel Christopher Bohen, Charlotte, NC (US); Shane Anthony Johnson, Charlotte, NC (US); Amy Baker Folk, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 504 days.

(21) Appl. No.: 12/277,906

(22) Filed: Nov. 25, 2008

(51) Int. Cl.
*G06Q 10/00* (2012.01)

(52) U.S. Cl.
USPC .................. 705/28; 705/16; 705/21; 705/69; 235/379; 235/383

(58) Field of Classification Search
None
See application file for complete search history.

(56) References Cited

U.S. PATENT DOCUMENTS

| | | | |
|---|---|---|---|
| 5,451,757 A | 9/1995 | Heath, Jr. | |
| 5,488,358 A | 1/1996 | Hamilton et al. | |
| 5,541,581 A | 7/1996 | Trent | |
| 5,873,276 A | 2/1999 | Dawson et al. | |
| 5,905,810 A | 5/1999 | Jones et al. | |
| 6,128,402 A | 10/2000 | Jones et al. | |
| 6,230,928 B1 | 5/2001 | Hanna et al. | |
| 6,378,770 B1 | 4/2002 | Clark et al. | |
| 6,523,742 B1 * | 2/2003 | Awatsu et al. ................. | 235/379 |
| 6,540,136 B1 | 4/2003 | Ross | |
| 6,848,612 B2 | 2/2005 | Uematsu et al. | |
| 6,948,655 B2 | 9/2005 | Washington et al. | |
| 6,976,634 B2 | 12/2005 | Washington et al. | |
| 6,983,836 B2 | 1/2006 | Adams et al. | |
| 7,000,778 B2 * | 2/2006 | Omori et al. .................. | 209/534 |
| 7,025,255 B1 | 4/2006 | Drummond et al. | |
| 7,121,461 B2 | 10/2006 | Washington et al. | |
| 7,185,749 B2 * | 3/2007 | Armanini et al. ............. | 194/302 |
| 7,309,005 B2 | 12/2007 | Washington et al. | |
| 7,362,891 B2 | 4/2008 | Jones et al. | |
| 7,850,076 B1 | 12/2010 | Dorenbaum | |
| 2001/0020638 A1 * | 9/2001 | Uematsu et al. .............. | 235/379 |
| 2001/0054643 A1 * | 12/2001 | Siemens ....................... | 235/379 |
| 2002/0017556 A1 * | 2/2002 | Putman et al. ................ | 235/379 |
| 2003/0083969 A1 * | 5/2003 | Uchiyama et al. ............. | 705/35 |
| 2004/0260650 A1 * | 12/2004 | Nagaya et al. ................. | 705/43 |
| 2005/0017066 A1 | 1/2005 | Carter | |
| 2005/0060233 A1 | 3/2005 | Bonalle et al. | |
| 2005/0080731 A1 | 4/2005 | Snyaneshwar | |
| 2005/0096986 A1 | 5/2005 | Taylor et al. | |

(Continued)

FOREIGN PATENT DOCUMENTS

| | | |
|---|---|---|
| EP | 1486923 | 12/2004 |
| WO | 2005038623 | 4/2005 |

OTHER PUBLICATIONS

International Search Report and Written Opinion for International Application No. PCT/US2007/088650, Mailed Sep. 16, 2008, 10 pages.

*Primary Examiner* — Fateh Obaid
(74) *Attorney, Agent, or Firm* — Banner & Witcoff, Ltd.; Michael A. Springs (57) ABSTRACT

A cash recycler includes one or more universal cartridges storing cash which may be exchanged between different types of cash recyclers. The swapping of universal cartridges may allow for improved efficiency when a cash handling device is detected to have a need for additional currency, removal of surplus currency, removal of unfit currency, and other services.

19 Claims, 8 Drawing Sheets

(56) References Cited

U.S. PATENT DOCUMENTS

| | | | |
|---|---|---|---|
| 2005/0108164 A1* | 5/2005 | Salafia et al. | 705/42 |
| 2006/0022032 A1 | 2/2006 | Fillinger et al. | |
| 2006/0065717 A1 | 3/2006 | Hurwitz et al. | |
| 2007/0045395 A1* | 3/2007 | Corona et al. | 235/379 |
| 2007/0063016 A1* | 3/2007 | Myatt et al. | 235/379 |
| 2008/0149706 A1 | 6/2008 | Brown et al. | |
| 2009/0222362 A1* | 9/2009 | Stood et al. | 705/30 |
| 2010/0065623 A1* | 3/2010 | Sauter | 232/1 D |

* cited by examiner

UNIVERSAL CARTRIDGE FOR DIFFERENT CASH RECYCLERS

BACKGROUND

There are many different types of cash handling devices which exist today to serve many different functions. For example, Automated Teller Machines (ATMs) are available as a convenient conduit for withdrawing and depositing cash. ATMs may be strategically placed in areas the financial institution believes to be the most convenient or popular to users. Another example of a cash handling device is a self-service payment machine, such as those found in grocery stores, gas stations, and the like. Such devices may allow a user to pay for purchases without waiting for a cashier to scan and/or input the cost of items and to receive payment. While these cash handling devices may differ in a number of ways, they also share similarities including receiving and dispensing cash.

Typically, cash handling devices are mechanically distinct enough from one another that they each have their own system and configuration for cash storage. For example, a cash handling device may have both a cartridge for storing overflow cash and a stacker for storing particular denominations of one bill (e.g., storage module for all $5 bills). The cartridge may be larger or smaller than the stacker and might not be configured for swapping with the stacker. Additionally, different storage components of a cash handling device might not be compatible with storage components of another cash handling device. A cartridge of an ATM, for example, may be different and might not be configured to be swappable with a cartridge or stacker of a point of sale device. Even different models or vintages of a particular type of cash handling device (e.g., ATM) may have cartridges that are configured differently may be non-compatible even within the same family of cash handling device. These different storage configurations make transferring currency from one type of cash handling device to another complex and time consuming. For instance, in some arrangements currency may have to be manually removed from one storage device and placed in another by an individual such as a store employee, transportation carrier, and the like. Providing compatible or even universal storage modules may improve efficiency associated with cash handling devices. Due to the current incompatibility inefficiency, cross-machine swaps are rarely attempted. Rather, funds are removed and/or replenished individually between each machine and the vault, which results in excessive movement and re-handling of funds.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

Aspects of this invention relate to an interchangeable inventory management system that allows funds to be moved easily between different or similar types of cash handling devices. The system may determine that a cash handling device requires replenishment of funds or removal of funds. The system may then prepare a cartridge with funds for replenishment (if the cash handling device is lacking) or an empty cartridge (if the cash handling device is full). The system may direct an agent, such as a transportation carrier, to replace the cartridge within the cash handling device with the prepared cartridge. Upon confirmation that the existing cartridge was removed from and the prepared cartridge was inserted into the cash handling device, the system may properly account for the additional funds added or surplus funds collected. The system may further determine that the retrieved cartridge is proper for insertion into a different cash handling device. For example, the retrieved cartridge may be empty and may replace a cartridge with surplus cash at a different cash handling device.

BRIEF DESCRIPTION OF THE DRAWINGS

The present disclosure is illustrated by way of example and not limited in the accompanying figures in which like reference numerals indicate similar elements.

The reader is advised that the attached drawings are not necessarily drawn to scale.

DETAILED DESCRIPTION

Aspects of the present disclosure relate to cash handling devices. Cash handling devices generally refer to devices that are configured to accept and/or dispense currency. Cash handling devices include ATMs, point of sale devices, self-service payment cash handling device, retail deposit only machines, retail cash recyclers, vending machines, retail deposit only smart safe, bank center cash recyclers and the like. Some cash handling devices may be currency recyclers, which generally refer to cash handling devices that are configured to dispense the same currency that was earlier deposited. For example, if a user deposits a 5 dollar bill into a cash recycler machine, the same 5 dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

Figure 1:
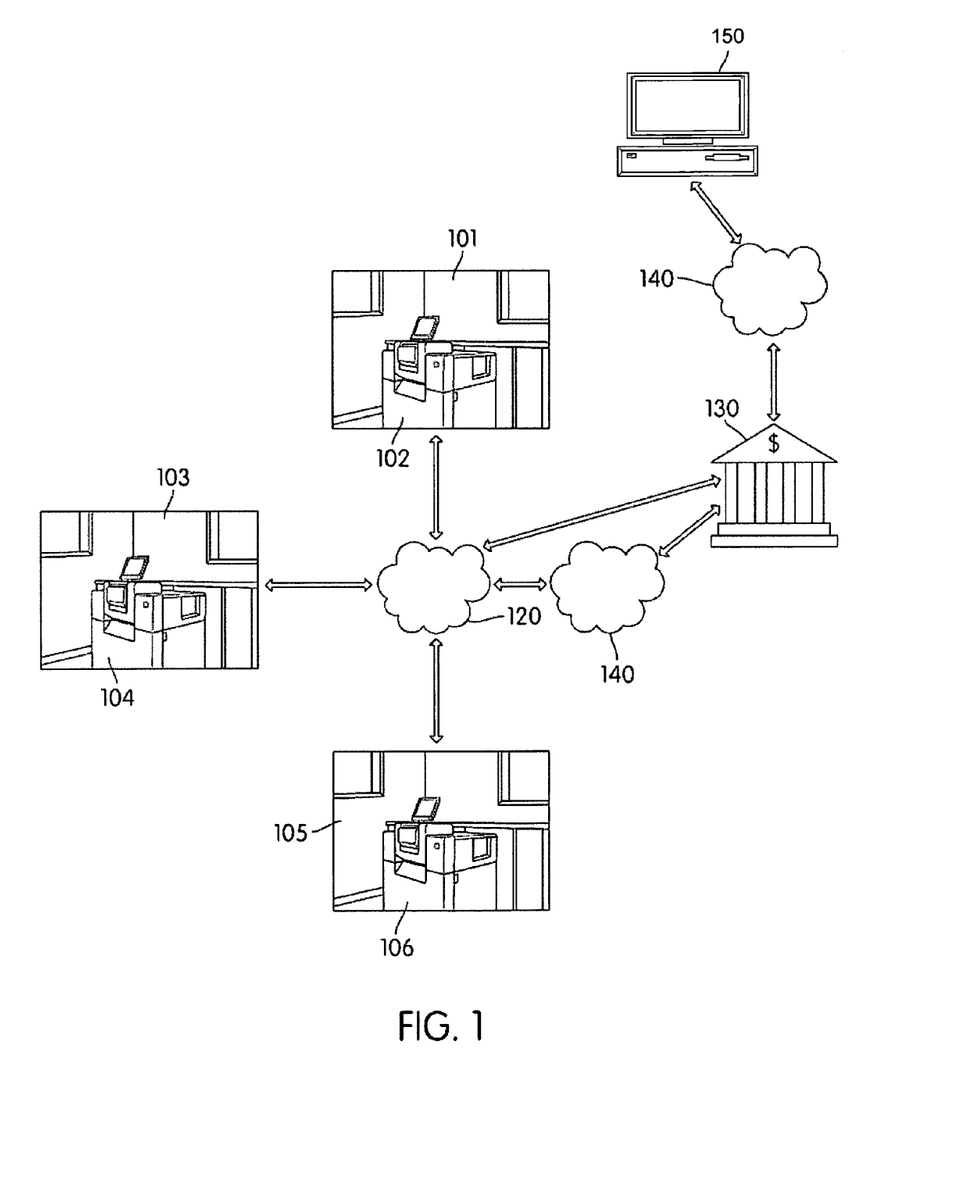
FIG. 1 illustrates an example of a suitable operating environment in which various aspects of the disclosure may be implemented.

FIG. 1 illustrates an example of a suitable operating environment in which various aspects of the disclosure may be implemented. Devices 102, 104, 106 may include currency recyclers and/or other cash handling devices and may be located at various sites such as locations 101, 103, and 105. The locations may represent different stores of a business enterprise. For example, locations 101, 103, and 105 may represent three different grocery stores located in different geographical areas belonging to a grocery store chain. Those skilled in the art will realize that additional cash handling devices may be located in the same store or in other stores belonging to the grocery store chain. In addition, those skilled in the art will realize that a grocery store chain is only one illustrative example of the types of locations or businesses that cash handling devices such as recyclers may be located. For example, cash recyclers may also be located in gas stations, post offices, department stores, and other places where cash and other financial instruments are deposited or withdrawn.

FIG. 1 further illustrates that cash handling devices 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash handling devices 102, 104, and 106 may communicate with one another or with a financial institution such as bank 130 via communication network 120 in various manners. For example, communications between cash handling devices 102, 104, 106 and bank 130 may use protocols and networks such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like. Communications network 120 may be directly connected to a financial institution such as bank 130. In another embodiment, communications network 120 may be connected to a second network or series of networks 140 before being connected to bank 130. According to one or more arrangements, bank 130 may utilize an infrastructure which includes a server 150 having components such as a memory, a processor, a display, and a communication interface.

Figure 2:
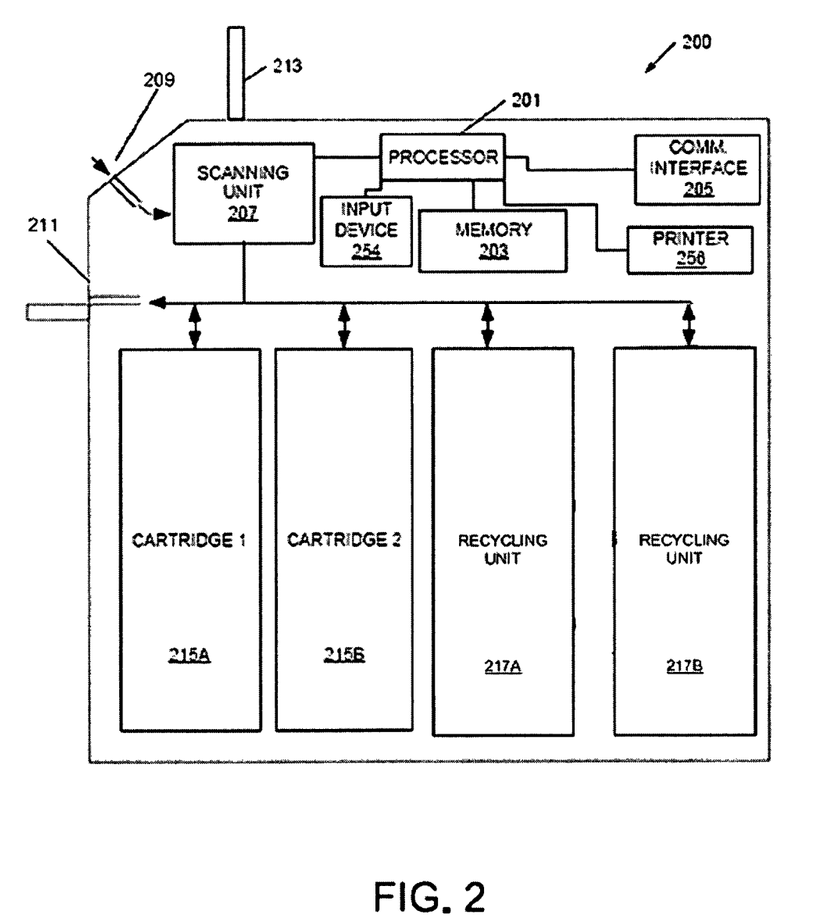
FIG. 2 illustrates a simplified diagram of a currency recycler in accordance with an aspect of the invention.

FIG. 2 illustrates a simplified diagram of a cash recycler that may be used in accordance with the operating environment of FIG. 1. Cash recycler 200 may include processor 201, memory 203, communication interface 205, scanning unit 207, display 213 and various cartridges 215 and recycling units 217. Processor 201 may be generally configured to execute computer-readable instructions stored in memory 203 such that, for example, cash recycler 200 may send and receive information to and from a bank (e.g., bank 130 of FIG. 1) using communication interface 205 and via a network (e.g., networks 120 and/or 140 of FIG. 1). Memory 203 may be configured to store a variety of information including the aforementioned computer-readable instructions, funds balance data, reconciliation data, user account information and the like. Additionally, memory 203 may include non-volatile and/or volatile memory. One or more databases may be stored in the memories 108, 112, and 116.

Cash recycler 200 may further provide display 213 to present data and/or messages to a user. For example, display 213 may be configured to display a recycler balance, a transaction interface, a current deposit count, security options, transportation options and the like. One or more input devices 254 such as a keypad, keyboard, mouse, touchscreen, fingerprint scanner, retinal scanner, proximity card reader, RFID scanner and/or writer, magnetic card reader, barcode reader, and/or combinations thereof, or any other type of input device or reader capable of inputting, reading, or scanning indicia or information, may also be included in or connected to recycler 200. One or printers 256 may also be included in or connected to recycler 200 for printing receipts and notifications as well.

In cash recycler 200, recycling units 217 and cartridges 215 are configured to store currency. Currency may be inserted through input slot 209 and withdrawn through withdrawal slot 211. Recycling units 217, including stackers, rolled storage modules, and the like, may be used to store and organize currency based on denomination. For example, all $5 bills may be stored in recycling unit 2 (i.e., recycling unit 217A) while all $20 bills may be stored in recycling unit 3 (i.e., recycling unit 217B). Cartridges 215A and 215B, on the other hand, may be used to store overflow currency and/or currency for transport. Thus, if recycling units 217 become full, additional currency that is deposited into recycler 200 may be stored in an overflow cartridge such as cartridge 215B. One of cartridges 215A or B may be designated as a transport cartridge that stores currency to be withdrawn from the machine and transported to the bank. Alternatively or additionally, one or more of cartridges 215 may be used as an unfit bill store for currency determined to be defective. Cartridges 215 and recycling units 217 may further be removable for easier access or transport.

Scanning unit 207 may be configured to scan each bill or currency that is inserted into recycler 200. Scanning unit 207 may be configured to detect defects, unauthorized reproductions, denomination, type of currency (e.g., which country the currency originates from) and the like. Scanning unit 207 may further be configured to refuse money (either through input slot 209 or withdrawal slot 211) if it cannot be properly recognized or if the currency is deemed to be an unauthorized reproduction. Scanning unit 207 may send such data to processor 201 which may, in turn, save the data in memory 203. In addition, scanning unit 207 may be configured to scan checks or other non-currency paper items, in addition to paper currency.

Further, recycler 200 may include one or more mechanical or electromechanical systems (not shown) for automatically transferring currency between stackers 217, cartridges 215, input slot 209 and withdrawal slot 211 in recycler 200. For example, currency may automatically be withdrawn from recycling units 217 and directed into cartridge 215A for storage using a series of motorized rollers. In another example, currency stored in cartridge 215A may be withdrawn and organized and stored into recycling units 217 according to denomination. Using such systems to facilitate the automated movement of currency between storage components and other portions of recycler 200 may provide efficiency and security by alleviating some of the need to manually handle currency stored within recycler 200. In addition, the cartridges (215A and B) and recycling units (217A and B) may be configured to include a radio frequency identification (RFID) tag (not shown) and recycler 200 may include a RFID reader (also not shown). This RFID reader may be internal to the cash handling device and may be different than the RFID reader discussed above as an input reader. The RFID reader may be able to read stored information on the RFID tags and may further be able to edit information stored on the RFID tags. For example, accounting of the different denominations withdrawn and inputted to a cartridge or recycling unit may be performed at least in part based on the information stored on the RFID tag. If a $20 bill is dispensed from a recycling unit, the RFID tag corresponding to the recycling unit may be updated to reflect the current number of $20 bills within the cash handling device.

Figure 3:
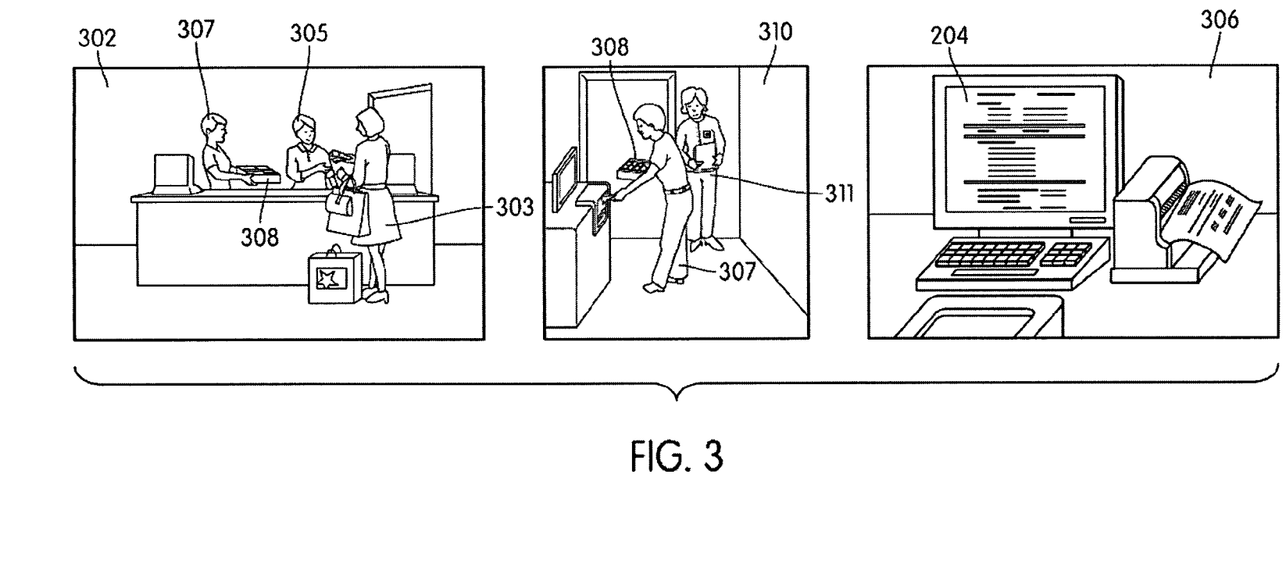
FIG. 3 illustrates various features of a currency recycler that may be used in accordance with aspects of the invention.

FIG. 3 illustrates various features of cash recycler, such as cash recycler 200 of FIG. 2, used in various aspects of the invention. The images in FIG. 3 depict use of a single cash recycler 200 in a retail environment. The retail owner may have a cash recycler 200 located in each of their stores. In an aspect of the invention, summary information for the retail owner's stores may be available via an interface to the financial institution. In another embodiment, access to summary information may be available directly from each of the cash recyclers 200.

In FIG. 3, image 302 depicts customer 303 paying cash to a retail employee such as store cashier 305 for a purchase. Another store cashier 307 at a recently closed cash register may be carrying a cash drawer or till 308 to a back office for reconciliation. In image 310, store cashier 307 may load currency from cash register till 308 into cash recycler 200. In addition, store cashier 307 may also deposit other paper forms of payment received from customer such as checks. An office manager 311 may be supervising cashier 307 during the loading of cash register till 308 into cash recycler 200. Moreover, upon the start of a shift a cashier may fill his/her cash register till with a designated amount of currency dispensed from cash recycler 200.

In image 306 of FIG. 3, a display screen (e.g., display 213 of cash recycler 200 of FIG. 2) may show the total amount entered into cash recycler 200 from till 308. The display screen 213 may breakout the amount entered into cash recycler 200 by denomination and by each cashier. The total amount deposited and withdrawn from cash recycler 200 may be shown on display screen 213.

Figure 4:
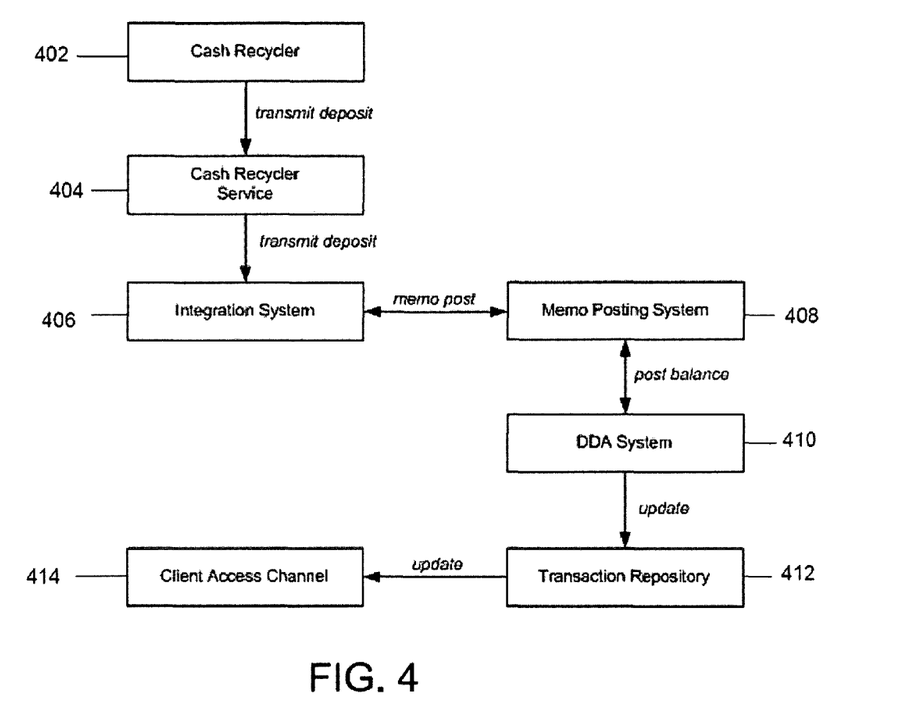
FIG. 4 illustrates a system configuration that may be used in accordance with an aspect of the invention.

FIG. 4 illustrates a system configuration that may be used in accordance with an aspect of the invention. In FIG. 4 a cash recycler 402 may communicate information to cash recycler service 404 located at a remote location. For example, cash recycler 402 may communicate deposit and withdrawal information from an enterprise location (e.g., a retail store) to the remote cash recycler service 404. The information may be routed through various networks such as the Internet to reach the cash recycler service. The cash recycler service 404 may be located in the data center of a financial institution. The cash recycler service 404 may communicate with an integration system 406 which provides access to the financial systems and processes. The integration system 406 may communicate with a memo posting system 408 which may perform posting activity. The posting system 408 may update the appropriate DDA (direct deposit account) system 410 to reflect the balance changes in the enterprises account balances. The DDA system 410 may also update a transaction repository 412 for historical and intra-day reporting purposes. An enterprise employee may access information stored in the transaction repository 412 through a client access channel 414 via web browser. Those skilled in the art will realize that the financial institution may allow the enterprise user to access the information stored in the transaction repository via numerous alternative communication methods.

According to one aspect, cash recyclers such as cash recycler 102 (FIG. 1) and 200 (FIG. 2) and other cash handling devices may facilitate real-time recognition of funds. In particular, funds deposited at a recycler or other cash handling device at a client site may be recognized by a bank at the time the deposit is made. Recognition refers to the real credit (i.e., not provisional) of deposited funds into a client's account. In contrast to current systems, there is no delay between a deposit of funds and when the funds and transaction data are submitted to the bank for recognition. Thus, instead of having to wait until the end of the day or another prescheduled time for deposits and/or withdrawals to be recognized by the bank, each deposit is processed for recognition in real-time. Data regarding the withdrawal or deposit transaction may be transmitted through a data network to the bank for recognition and processing. Providing real-time recognition offers may advantages including the ability for a client to withdraw the same currency that was earlier deposited for use in the client's operations, all at the client site and without having to first transport the deposited funds to the bank for recognition. Currency recyclers, recycling management and recognition of funds are further described in U.S. application Ser. No. 11/614,656, entitled "Commercial Currency Handling and Servicing Management," filed on Dec. 21, 2006, and U.S. application Ser. No. 12/241,385 entitled "Immediate Recognition of Financial Transactions," and filed on Sep. 30, 2008, the content of each being incorporated herein by reference in its entirety.

Figure 5:
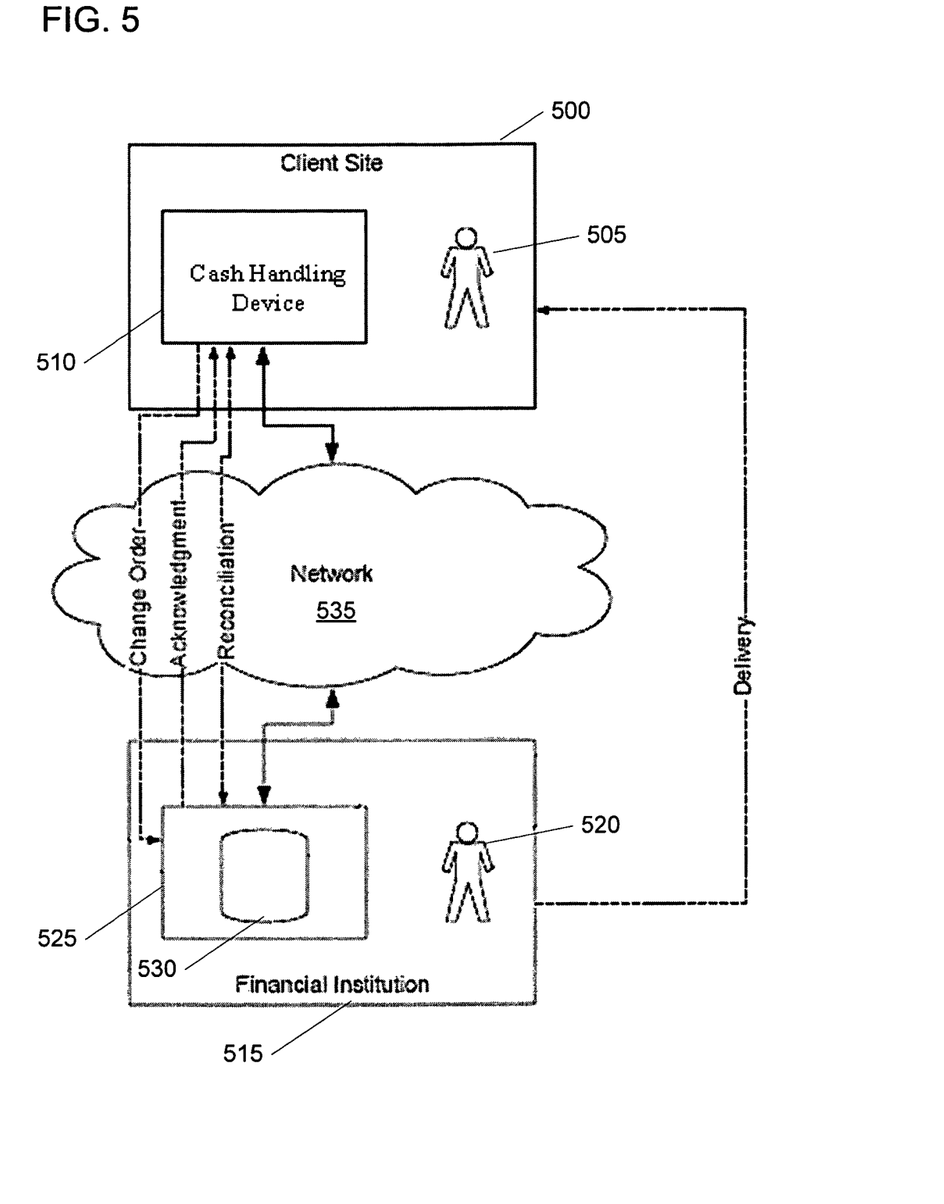
FIG. 5 illustrates an environment wherein the process of automatically generating a change order may be used in accordance with one or more aspects of the invention.

According to one aspect, the cash handling device may generate a request for additional funds, i.e., funds of a particular denomination, or for removal of surplus funds to a cash processing center, such as a financial institution. The phrase "change order" as used herein may be used to describe a request for additional funds or a request for removal of surplus funds. FIG. 5 illustrates an environment wherein the process of automatically generating a change order may be used according to one or more aspects described herein. Details of such a process is further described in U.S. application Ser. No. 12/241,390 entitled "Forecasting Levels of Currency Usage and need," filed Oct. 2, 2008, the content of which is incorporated herein by reference in its entirety. Additional details relating to currency balancing or rebalancing are included in U.S. patent application Ser. No. 12/183,737, entitled "Transportation Withdrawal and Rebalance of Cash Handling Device" and filed on Jul. 31, 2008, and U.S. patent application Ser. No. 12/241,196, entitled "Transportation Withdrawal and Inventory Verification of Cash Handling Device" and filed on Sep. 30, 2008, the content of each being incorporated herein by reference in its entirety.

Referring back to FIG. 5, cash handling device 510 may be located in a client site, such as retail store 500. A user 505 may interact with cash handling device 510 in order to configure and/or conduct transactions at cash handling device 510. In addition, cash handling device 510 may communicate with various locations and/or remote devices, such as computers, mobile devices, point of sale systems, and the like via network 535.

In one or more configurations, a cash handling device 510 may be configured to communicate with a financial institution computer 525 across the network 535. Financial institution computer 525 may be located in a financial institution, such as a bank 515, and financial institution computer 525 may have database 530 stored therein. A bank employee 520 may interact with financial institution computer 525 in performing various functions, such as account management.

In some arrangements, a universal cartridge configured to have a size and shape to allow the cartridge to be inserted into a cash handling device (e.g., cash handling device 510) and to hold or carry cash (e.g., as a storage module for cash). The cartridge may be made of a material such a metal, plastic or a combination of these and/or other materials. The universal cartridge may be used in a plurality of different cash handling devices such as cash recyclers. Universal cartridge provides ease of replacement in several different cash recycling units because a cartridge may be removed from one unit and replaced with a universal cartridge, rather than requiring replacement with a cartridge specific to that cash recycler.

In other arrangements, a plurality of different types of cash handling devices, such as ATMs, cash recyclers, point of sale systems, and the like may use the same or substantially similar universal cartridge. In one example, one cartridge from an ATM may be removed and inserted into another ATM, point of sale system, or any other cash handling device. In another example, the universal cartridge may be ported onto a docking station. Once docked into the station, the cartridge may receive and/or dispense cash. Such combinations are endless and allow for increased flexibility and uniformity with respect to cartridge replacement. In conventional systems, each different type of cash handling device has its own type of storage module or cartridge thereby preventing a storage module from one type of cash handling device to replace a storage module in another type of cash handling device. However, the universal cartridge described herein may be used in any type of cash handling device, thereby providing ease of replacement or exchange of cartridges between different types of devices.

In one aspect, older cash handling device may be retrofitted to accept universal cartridges. For example, an older model of an ATM which only uses one specific model of a cartridge may be adapted to accept the universal cartridges.

In another aspect, cartridges may be interchangeable (e.g., may be inserted and removed) between cash handling devices from different manufacturers, different model years, and the like. For example, a cartridge may be compatible with an older model of Company A's ATM (year 1990 version), a newer model of Company A's ATM (year 2000 version), an older model of Company B's Point of Sale Device (year 1995 version), and a newer model of Company B's Point of Sale Device (year 2008 version).

In some arrangements, the cash handling device 510 may communicate with the financial institution, such as the computer 525, via network 535 to indicate to computer 525 that there currently exists, or is predicted to exist, a shortage of cash, including currency or coins of one or more denominations, as well as to determine whether there is a predicted shortage of currency or coins of one or more denominations. In addition or alternatively, the cash handling device 510 may automatically generate a change order and communicate with the financial institution computer 525 across the network 535 to submit the change order to a financial institution for processing and fulfillment. Further, the cash handling device 510 may communicate with the financial institution computer 525 across the network 535 to trigger debiting of one or more accounts at an associated financial institution or to receive bills and/or coins of one or more denominations pursuant to an automatically-generated change order. In still other arrangements, the cash recycler 510 may communicate with the financial institution computer 525 across the network 535 to reconcile a request for more bills or coins of one or more denominations.

Figure 6:
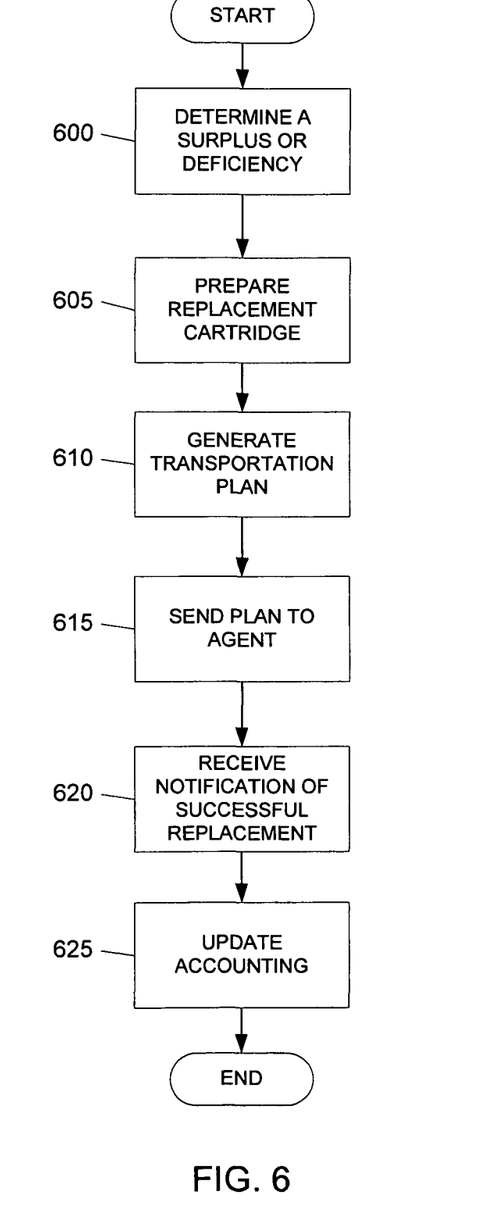
FIG. 6 illustrates a method of dynamic inventory management via interchangeable cartridges in accordance with one or more aspects of the invention.

After a request for a change order is made, for example, according to FIG. 5, the order may be fulfilled by the financial institution to which the change order was submitted. FIG. 6 illustrates a method of dynamic inventory management via interchangeable cartridges. At step 600, a computer, e.g., a bank computer (such as financial institution computer 525 in FIG. 5) at a central cash processing center may receive a request that a cash handling device, e.g., cash recycler 510 has either a surplus or a deficiency of bills and/or coins of one or more denominations. In one example, the bank computer may receive a request from a particular cash handling device. Alternatively, the bank computer via a network may monitor in real time the denominations of cash within each cash handling device connected to the network and may determine surpluses and deficiencies based on the monitored levels.

At step 605, a cartridge containing the required cash (e.g., where the change order indicates a deficiency) or an empty cartridge (e.g., where the change order indicates a surplus) is prepared. Preparation may include ensuring that the cartridge meets monetary requirements (e.g., that the cartridge has been filled with the correct number of bills of the particular denominations) and may further include ensuring that the cartridge meets quality requirements (e.g., that each part of the cartridge is in usable shape). Additionally, preparing the cartridge may include scanning a RFID tag on a cartridge to identify the cartridge and to edit information on the RFID tag associated with the cartridge, such as to update which cash handling device the cartridge is intended for, how much cash is inside the cartridge, denominations of the cash inside the cartridge, identification of the cartridge to be replaced (if any) at the cash handling device, and the like. The RFID tag may also store information useful for accounting such as account numbers, vault information, and the like.

At step 610, a sequential inventory/transportation plan detailing which cartridges are to be removed from which cash recyclers and which cartridges are to be inserted into which recyclers is prepared. The plan may include servicing any number of cash handling devices. For example, such a plan may simply schedule just replacing one cartridge at a cash handling device or the plan may schedule replacing multiple cartridges in a plurality of different cash handling devices located in one general area or several areas. The schedule may be customized according to any number of schemes based on efficiency, urgency, or any other criteria set forth by the financial institution. The plan may also include a timing schedule, a driving route, and the like. In one example, the cash handling device may separate low quality currency or currency otherwise unfit for circulation (e.g., bills with rips, tape, writing, and the like) in a cartridge and request removal. In such a situation, the removal may be a low priority removal and may be scheduled after replenishing and/or collecting surplus cash from other cash handling devices. The plan may also account for malfunctioning cartridges and may deem request for the replacement of malfunctioning cartridges to be of the highest priority. In these situations, the retrieved malfunctioning cartridges may be delivered to a service center for diagnostic tests and repairs.

Figure 8:
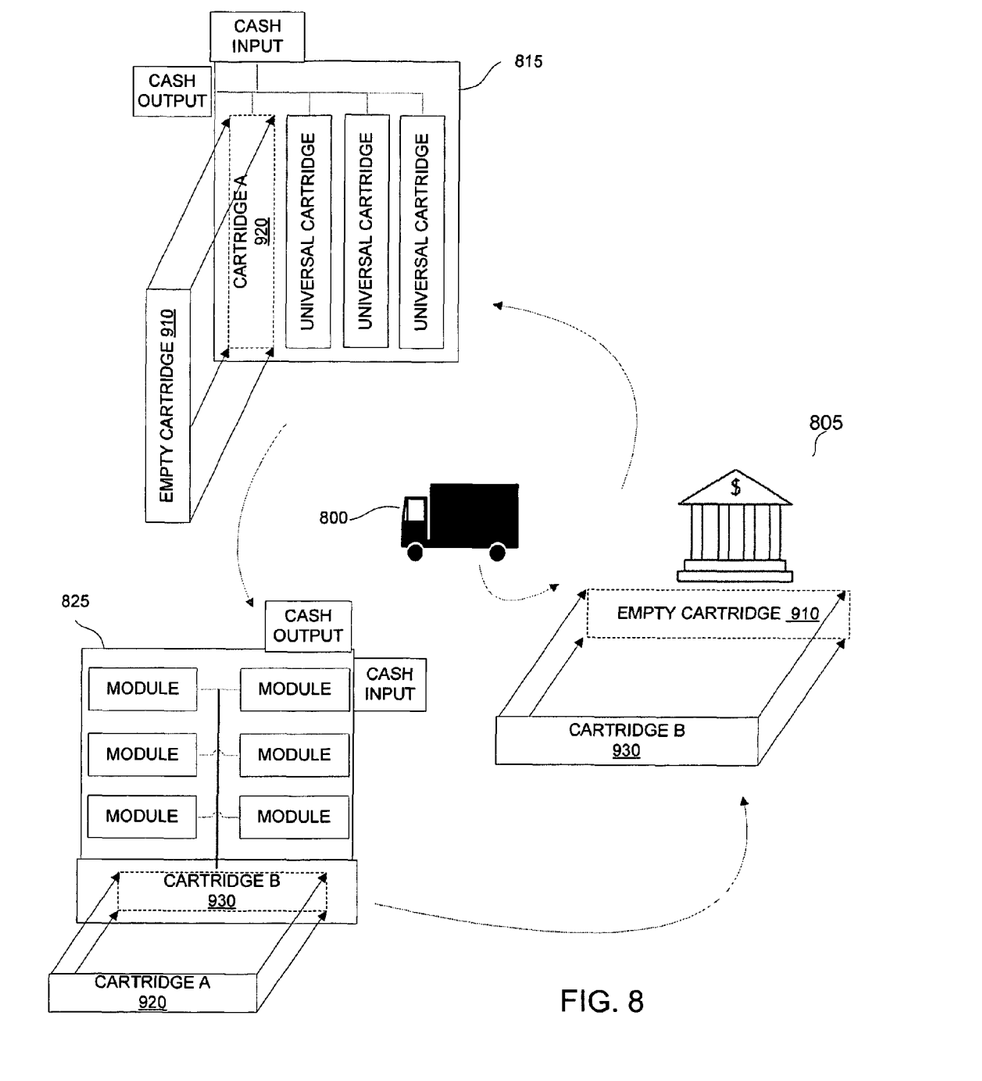
FIG. 8 illustrates an exemplary scenario of swapping universal cartridges by an agent in accordance with one or more aspects of the invention.

The transportation plan may be sent to an agent, such as a transport carrier, for transporting the cartridges to the appropriate recyclers at step 615. In response, the agent, such as agent 800 in FIG. 8, may pick up the prepared cartridges at the central cash processing center and may execute the instructions set forth in the transportation plan. The word "agent" may be used interchangeably with "cash-in-transit" or "transport carrier" and may include a team of agents performing the tasks set forth in the transportation plan. For example, FIG. 8 illustrates a scenario where cash handling device A 815 (e.g., an ATM) may report a surplus of $20 bills and request that universal cartridge A 820 housing the surplus of $20 bills be replaced. Cash handling device B 825 (e.g., a point of sale device) may report a deficiency of $20 bills and a surplus of $5 bills and may request that universal cartridge B 830 housing the surplus of $5 bills be replaced. In this scenario, the plan may instruct the agent to retrieve empty universal cartridge 810 from bank center 805 for delivery to cash handling device A 815 and to replace universal cartridge A 820 with the empty universal cartridge 810. The plan may then instruct agent 800 to replace universal cartridge B 830 of cash handling device B 825 with universal cartridge A 820, and finally, the plan may instruct the agent to return universal cartridge B 830 to bank center 805 where the universal cartridge may be stored and/or prepared for delivery to a cash handling device requiring the cartridge. In one aspect, cash handling device A and cash handling device B may be any cash handling device such as, but are not limited to ATMs, Point-of-sales, and the like. Additionally, cash handling device A may be the same or different type of cash handling device as compared to cash handling device B.

Alternatively, each retrieved cartridge may be delivered to a bank center, e.g., the central cash processing center for preparation before the cartridge is re-used at a different or same cash handling device.

Referring back to FIG. 6, at step 620, the cash handling device may transmit notification to the bank computer that the prepared cartridge has been successfully inserted and confirm that the cash handling device request has been completed. The cash handling device may also transmit information for accounting purposes such as how much cash was received in the prepared cartridge or how much cash was in the removed cartridge, and the like. A RFID tag located on the cartridge may be used to store some of the transmitted information such as how much cash is in cartridge.

At optional step 625, the computer may update accounting corresponding to the replacement of the cartridge and may remove the completed request or requests from a task list or may otherwise designate the requests as "completed".

In another aspect, the transportation plan may be constructed or revised in real time in connection with cash inventory levels at the different cash handling devices and may be communicated to a carrier via, for example, a mobile device such as a laptop, hand-held computer, a mobile phone, and the like. By utilizing real-time inventory levels, updates to the transportation plan may improve the efficiency of cash transfers, e.g., replenishing or retrieving surplus cash. By monitoring inventory levels, carriers may be advised of servicing needs throughout the day. In addition, there may be real-time assessments of a particular carrier unit. For example, as change orders are requested by a cash handling device, a central processing center may determine whether a particular carrier unit is in the local area using e.g., Global Positioning System (GPS) and if so, whether the particular carrier unit has sufficient cash and/or cartridges to handle the request.

In another aspect, the cartridges may be "smart cartridges." Smart cartridges may be configured to determine the real-time inventory levels at the time of servicing and may replenish or withdraw surplus funds as appropriate. For example, if an ATM has requested one hundred additional $20 bills, but between the request and the replenishment, a user has deposited ten $20 bills, at the time of replenishment, the smart cartridge may determine that only ninety $20 bills are needed and may deposit ninety $20 bills into the ATM. The remaining 10 $20 bills may be, for example, held as surplus at the smart cartridge or may be dispensed to the carrier unit for delivery to another cash handling device. Smart cartridges may be able to update in real-time via the RFID tags upon identification with the cash handling device the cartridge is about to service. Alternatively, smart cartridges may be equipped with a processor, memory and a transceiver for receiving and sending inventory information and may communicate with either the cash handling device and/or a central processing center to determine cash to be withdrawn into or deposited by the smart cartridge.

Figure 7:
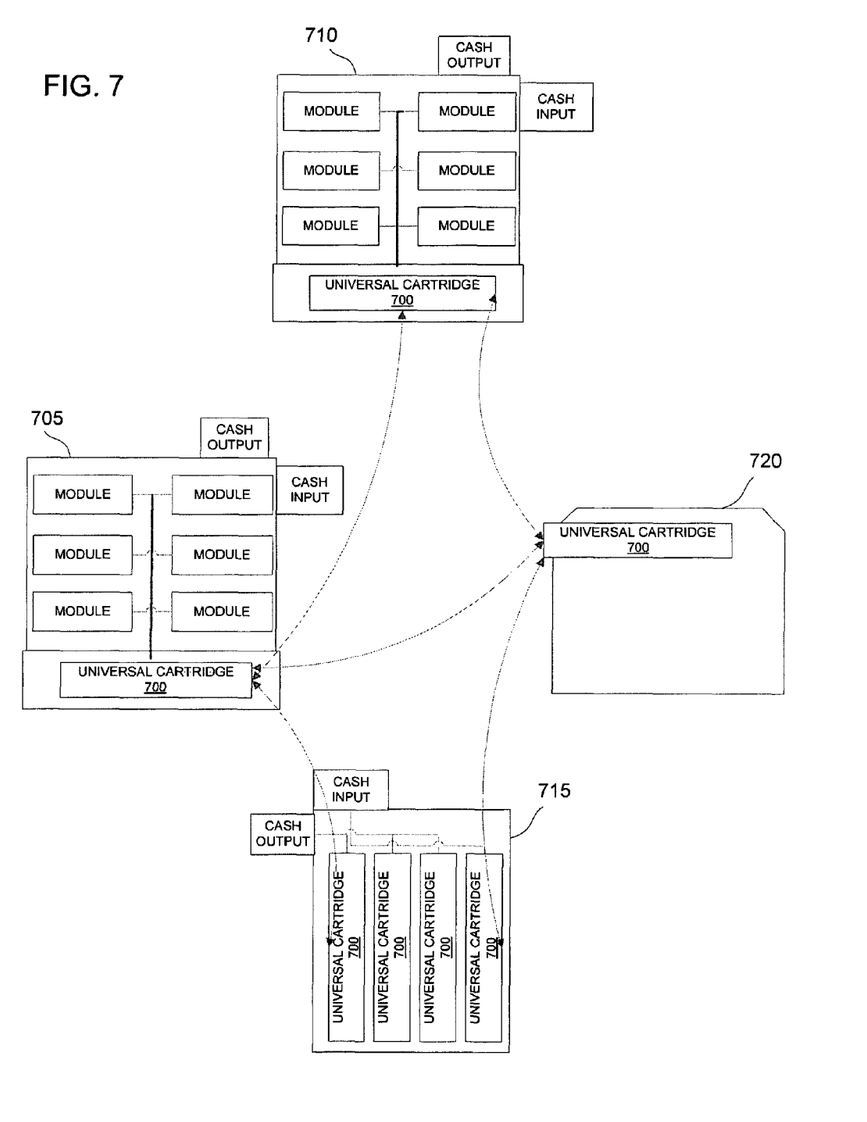
FIG. 7 illustrates an example of the versatility of a cartridge in accordance with one or more aspects of the invention.

FIG. 7 illustrates an example of the versatility of a universal cartridge according to aspects described herein. Universal cartridge 700 may be removably inserted or attached to bank center cash recycler 705, client cash recycler 710, such as a cash recycler located at a retail store, ATM 715 and vault cash handling equipment 720. Universal cartridge 700 may also be compatible with various other cash handling devices (not shown). In one example, cartridge 700 may be inserted into one cash handling device (e.g., an ATM) and removed and inserted into a different cash handling device (e.g., point of sale) and may further be removed and inserted into another different cash handling device (e.g., bank cash recycling center) without any modification. Such a universal cartridge may save valuable time and effort otherwise required in transferring money from, for example, a cartridge within an ATM to a different and non-ATM compatible cartridge in a point-of-sale device. In one configuration, cartridges may also be interchangeable with recycling units. For example, cartridge 215A and recycling unit 217A of FIG. 2 may both be universal cartridges (e.g., cartridge 700) and may only differ in their respective role as part of the cash handling device 200. Interchangeability of cartridge 700 may allow cartridge 215A to be swapped with recycling unit 217A without modification. In other arrangements, the cartridges may be exchanged between different cash recycler, in addition to being exchanged with other cartridges within the same cash recycler.

Compatibility between cartridges and recycling units additionally may allow for greater efficiency by financial institutions managing the cash recycling devices. For example, cartridges such as cartridge 215B may be used at a more infrequent basis as compared to recycling unit 217A and thus may have less wear and tear with respect to slots, storage section, and other internal aspects. Cartridge 215B may be swapped with recycling unit 217A when the internal aspects of recycling unit 217A have worn down such that the recycling unit 217A might not be suitable for usage as a recycling unit, but may still have functionality as a cartridge. Such a concept may be analogous to "rotating tires of a car" and may assist in maximize the life of cartridges and recycling units.

In one aspect, the universal cartridge may also have a RFID reader or editor which may edit information stored on the RFID tag to reflect any adding or subtracting of funds from the cartridge. Such a function may allow the cartridge information to be updated independently from a cash handling machine and may be useful in situations where manual addition or subtraction of cash is performed.

In another aspect, universal cartridges might not necessarily be identical to one another, although such a feature is certainly possible. In one aspect, cartridge Y fitting cash handling devices A-C may have features different than another cartridge Z fitting cash handling devices A-C. For example, cartridge Y may be configured to be opened while cartridge Z might not be configured to be opened for increased security. However, both cartridges are universal as they both fit and capably perform the functions required by cash handling devices A-C. Such a feature may, for example, allow older versions of cartridges to remain useful even when newer version of cartridges with upgrades are circulated into usage.

Although not required, one of ordinary skill in the art will appreciate that various aspects described herein may be embodied as a method, a data processing system, or as one or more computer-readable media storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

The invention claimed is:

1. A method, comprising:

determining, by a first cash recycler, that a first cartridge housed in the first cash recycler has at least one of a surplus and deficiency of at least one denomination of cash, wherein the first cartridge is configured to accept and dispense the at least one denomination of cash;

preparing, by a second cash recycler, a second cartridge for exchanging with the first cartridge of the first cash recycler, the second cartridge being housed in the second cash recycler and interchangeable with the first cartridge, wherein the second cartridge is configured to accept and dispense bills of the at least one denomination of cash, and wherein the first cartridge and the second cartridge are configured to be removably insertable into a plurality of different cash recyclers, at least one of the plurality of different cash recyclers being a different manufacture or different model from another of the plurality of different cash recyclers;

receiving, by the first cash recycler, the second cartridge in exchange for the first cartridge, the first cartridge containing a different number of bills of the at least one denomination of cash than the second cartridge; and transmitting, by the first cash recycler, a notification indicating that the first cartridge was removed from the first cash recycler and indicating that the second cartridge was inserted into the first cash recycler.

2. The method of claim 1, further comprising:

in response to receiving the second cartridge in exchange for the first cartridge, reconciling, by the first cash recycler, an amount of funds available at the first cash recycler.

3. The method of claim 1, further comprising:

determining, by the first cash recycler, that the first cash recycler no longer has a surplus or deficiency of the at least one denomination of cash.

4. The method of claim 1, wherein the first cash recycler determines that the first cartridge has a surplus of at least one denomination of cash, and wherein the second cash recycler prepares the second cartridge to include fewer bills of the surplus denomination than the first cartridge.

5. The method of claim 1, wherein the first cash recycler determines that the first cartridge has a deficiency of at least one denomination of cash, and wherein the second cash recycler prepares the second cartridge to include more bills of the deficient denomination than the first cartridge.

6. The method of claim 1, further comprising:

receiving, by the second cash recycler, a real-time update of a cash inventory level of the first cash recycler after preparing the second cartridge; and adjusting, by the second cash recycler, the amount of cash in the second cartridge based on the real-time update.

7. The method of claim 1, further comprising:

selecting, by the first cash recycler, a third cash recycler to receive the first cartridge;

confirming, by the first cash recycler, that the first cartridge was inserted into the third cash recycler; and in response to receiving the first cartridge, accounting, by the third cash recycler, for the change of cash at the third cash recycler if the first cartridge contains cash.

8. The method of claim 1, further comprising:

determining, by the first cash recycler, that a number of bills of one or more denominations are unfit for recycling.

9. The method of claim 8, further comprising:

inserting, by the first cash recycler, the unfit bills into a third cartridge.

10. The method of claim 2, wherein the reconciling is based on first cash information stored on a first RFID tag associated with the first cartridge, second cash information stored on a second RFID tag associated with the second cartridge, and third cash information stored on a third RFID tag associated with the third cartridge.

11. The method of claim 1, further comprising:

generating, by the first cash recycler, a transportation plan; and sending, by the first cash recycler, the transportation plan to a transport carrier.

12. The method of claim 1, further comprising:

in response to determining that the first cartridge has a surplus of at least one denomination of cash, transmitting, by the first cash recycler, an alert indicating that the surplus exists and is comprised of at least one particular number of bills of at least one denomination.

13. The method of claim 12, wherein the first cartridge includes the cash determined to be the surplus.

14. The method of claim 1, further comprising:

in response to determining that the first cartridge has a deficiency of at least one denomination of cash, transmitting, by the first cash recycler, an alert indicating that the deficiency exists and that at least one particular number of bills of at least one denomination is needed to replenish the first cash recycler.

15. The method of claim 14, wherein preparing the second cartridge includes inserting into the second cartridge the at least one particular number of bills of the at least one denomination needed to replenish the first cash recycler.

16. At least one non-transitory computer-readable medium storing computer-executable instructions that, when executed, cause at least one processor to:

determine that a first cartridge housed in a first cash recycler has at least one of a surplus and deficiency of at least one denomination of cash;

transmit a replenishment request to a second cash recycler, the replenishment request being configured to cause the second cash recycler to prepare a second cartridge for exchanging with the first cartridge of the first cash recycler, the second cartridge being housed in the second cash recycler, wherein the first cartridge and the second cartridge are configured to be removably insertable into a plurality of different cash recyclers, at least one of the plurality of different cash recyclers being a different manufacture or different model from another of the plurality of different cash recyclers; and receive the second cartridge in exchange for the first cartridge, the first cartridge containing a different number of bills of the at least one denomination of cash than the second cartridge, wherein the first and second cartridge are configured to accept and dispense the at least one denomination of cash.

17. An apparatus comprising:

at least one processor;

memory storing computer-executable instructions that, when executed by the at least one processor, cause the apparatus to:
- determine that a first cartridge housed in the apparatus has at least one of a surplus and deficiency of at least one denomination of cash;
- transmit a replenishment request to a cash recycler, the replenishment request being configured to cause the cash recycler to prepare a second cartridge for exchanging with the first cartridge of the apparatus, the second cartridge being housed in the cash recycler, wherein the first cartridge and the second cartridge are configured to be removably insertable into a plurality of different cash recyclers, at least one of the plurality of different cash recyclers being a different manufacture or different model from another of the plurality of different cash recyclers; and
- receive the second cartridge in exchange for the first cartridge, the first cartridge containing a different number of bills of the at least one denomination of cash than the second cartridge, wherein the first and second cartridge are configured to accept and dispense the at least one denomination of cash.

18. The apparatus of claim 17, wherein the apparatus and the cash recycler are different types of cash recyclers.

19. The apparatus of claim 17, wherein the first cartridge and the second cartridge are configured to be removably insertable into a plurality of different types of cash handling devices.

* * * * *